(12) United States Patent
Landeck et al.

(10) Patent No.: US 6,782,394 B1
(45) Date of Patent: Aug. 24, 2004

(54) REPRESENTING OBJECT METADATA IN A RELATIONAL DATABASE SYSTEM

(75) Inventors: Albert B Landeck, Amherst, NH (US); Raja Chatterjee, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 249 days.

(21) Appl. No.: 09/669,084

(22) Filed: Sep. 25, 2000

Related U.S. Application Data

(60) Provisional application No. 60/166,847, filed on Nov. 22, 1999.

(51) Int. Cl.[7] .............................. G06F 7/00; G06F 17/00

(52) U.S. Cl. ................ 707/104.1; 707/103.4; 707/100

(58) Field of Search .............................. 707/104.1, 100, 707/103.4

(56) References Cited

U.S. PATENT DOCUMENTS

| | | | | | |
|---|---|---|---|---|---|
| 5,956,716 | A | * | 9/1999 | Kenner et al. | 707/10 |
| 6,167,404 | A | * | 12/2000 | Morcos et al. | 707/102 |
| 6,301,586 | B1 | * | 10/2001 | Yang et al. | 707/104 |
| 6,363,380 | B1 | * | 3/2002 | Dimitrova | 707/6 |
| 6,463,444 | B1 | * | 10/2002 | Jain et al. | 707/104.1 |

OTHER PUBLICATIONS

Stuart Weibel, et al., *OCLC/NCSA Metadata Workshop Report*, 1986, found Mar. 23, 2000 at http://www.oclc.org:5046/oclc/research/conferences/metadata/dublin_core_report.html.

Informix DataBlade Technology Data Sheet, Informix Corporation, 7/99, found April., 2000 at http://www.informix.com/informix/products/integration/datablade/datablade_ds.htm.

IBM DB2 Digital Library Version 2.4, Highlights, IBM Corporation, 4/99, found Apr., 2000 at www.software.ibm.com/dglib.

IBM DB2 Digital Library Version 2.4, IBM Corporation, 4/99, found Apr., 2000 at www.software.ibm.com/dglib.

* cited by examiner

*Primary Examiner*—Wayne Amsbury
*Assistant Examiner*—Cindy Nguyen
(74) *Attorney, Agent, or Firm*—Gordon E. Nelson

(57) ABSTRACT

Techniques used in database systems for dealing with metadata associated with multimedia objects. The database system includes a generic representation for metadata values. The representation includes a stratum specifier that specifies the stratum to which a metadata value applies, an extent specifier that specifies a portion of the stratum to which the metadata value applies, and a metadata item specifier that specifies the metadata value. The generic representation is implemented in an object-oriented relational database system. The generic representation of the metadata for a given multimedia object is contained in the object in the database that represents the multimedia object. Values of the representation may be returned by a query or may be used to select other values to be returned by a query, including the portion of an object associated with a metadata value.

40 Claims, 8 Drawing Sheets

| Dublin Core Attributes | | | |
|---|---|---|---|
| stataName 405 | Extent 407 | Value Datatype 409 | Value Meaning 411 |
| format | Global | VARCHAR2 | The physical or digital manifestation of the resource. Typically, Format may include the media-type or dimensions of the resource. Format may be used to determine the software, hardware or other equipment needed to display or operate the resource. Examples of dimensions include size and duration. Recommended best practice is to select a value from a controlled vocabulary (for example, the list of Internet Media Types [MIME] defining computer media formats). |
| title | Global | VARCHAR2 | A name given to the resource. Typically, a Title will be a name by which the resource is formally known. |
| subject | Global | VARCHAR2 | The topic of the content of the resource. Typically, a Subject will be expressed as keywords, key phrases or classification codes that describe a topic of the resource. |
| description | Global | VARCHAR2, CLOB or NCLOB | An account of the content of the resource. Description may include but is not limited to an abstract, table of contents, reference to a graphical representation content or a free-text account of the content. |
| creator | Global | VARCHAR2 | An entity primarily responsible for making the content of the resource. Examples of a Creator include a person, an organization, or a service. |
| publisher | Global | VARCHAR2 | An entity responsible for making the resource available. Examples of a Publisher include a person, an organization, or a service. |
| contributor | Global | VARCHAR2 | An entity responsible for making contributions to the content of the resource. Examples of a contributor include a person, an organization, or a service. |
| date | Global | DATE | A date associated with an event in the life cycle of the resource. Typically, Date will be associated with the creation or availability of the resource. Recommended best practice for encoding the date value is defined in a profile of ISO 8601 [W3CDTF] and follows the YYYY-MM-DD format. |
| type | Global | VARCHAR2 | The nature or genre of the content of the resource. Type includes terms describing general categories, functions, genres, or aggregation levels for content. Recommended best practice is to select a value from a controlled vocabulary (for example, the working draft list of Dublin Core Types [DCT1]). To describe the physical or digital manifestation of the resource, use the FORMAT element. |
| identifier | Global | VARCHAR2 | An unambiguous reference to the resource within a given context. Recommended best practice is to identify the resource by means of a string or number conforming to a formal identification system. Example formal identification systems include the Uniform Resource Identifier (URI) including the Uniform Resource Locator (URL)), the Digital Object Identifier (DOI) and the International Standard Book Number (ISBN). |
| source | Global | VARCHAR2 | A Reference to a resource from which the present resource is derived. The present resource may be derived from the Source resource in whole or in part. Recommended best practice is to reference the resource by means of a string or number conforming to a formal identification system. |

FIG. 4a

| 405 | 407 | 409 | 411 |
|---|---|---|---|
| language | Global | VARCHAR2 | A language of the intellectual content of the resource. Recommended best practice for the values of the Language element is defined by RFC 1766 [RFC1766] which includes a two-letter Language Code (taken from the ISO 639 standard [ISO639]), followed optionally, by a two-letter Country Code (taken from the ISO 3166 standard [ISO3166]). For example, 'en' for English, 'fr' for French, or 'en-uk' for English used in the United Kingdom. |
| relation | Global | VARCHAR2 | A reference to a related resource. Recommended best practice is to reference the resource by means of a string or number conforming to a formal identification system. |
| coverage | Global | VARCHAR2 | The extent or scope of the content of the resource. Coverage will typically include spatial location (a place name or geographic coordinates), temporal period (a period label, date, or date range) or jurisdiction (such as a named administrative entity). Recommended best practice is to select a value from a controlled vocabulary (for example, the Thesaurus of Geographic Names [TGN]) and that, where appropriate, named places or time periods be used in preference to numeric identifiers such as sets of coordinates or date ranges. |
| rights | Global | VARCHAR2 | Information about rights held in and over the resource. Typically, a Rights element will contain a rights management statement for the resource, or reference a service providing such information. Rights information often encompasses Intellectual Property Rights (IPR), Copyright, and various Property Rights. If the Rights element is absent, no assumptions can be made about the status of these and other rights with respect to the resource. |

[DUBLINCORE]

FIG. 4b

```
/* The Metadata object */
metaData            ORDMetaData    603

MEMBER PROCEDURE insertMetaData( strataName IN VARCHAR2,
                                 segmentValue IN ORDMetaDataValue,
                                 segmentExtent IN ORDSegmentExtent);
MEMBER FUNCTION selectMetaData(strataName IN VARCHAR2,
                               segmentExtent IN ORDSegmentExtent)
                               RETURN ORDMetaDataResult,
MEMBER PROCEDURE deleteMetaData(
                                strataName VARCHAR2,                    605
                                segmentValue IN ORDMetaDataValue,
                                segmentExtent IN ORDSegmentExtent );
MEMBER PROCEDURE updateMetaData(
                                strataName IN VARCHAR2,
                                newSegmentValue IN ORDMetaDataValue,
                                oldSegmentValue IN ORDMetaDataValue
                                segmentExtent IN ORDSegmentExtent);
MEMBER PROCEDURE insertSegmentMetaDataInBulk(
                                strataName IN VARCHAR2,
                                segmentValueSet IN ORDMetaDataValueSet,
                                segmentExtentSet IN ORDSegmentExtentSet);
MEMBER PROCEDURE updateSegmentMetaDataInBulk(                           607
                                strataName IN VARCHAR2,
                                oldValueSet IN ORDMetaDataValueSet,
                                newValueSet IN ORDMetaDataValueSet,
                                segmentExtentSet IN ORDSegmentExtentSet);
-- Support functions for base interMedia objects
MEMBER PROCEDURE identifyFormat()RETURN VARCHAR2,
MEMBER PROCEDURE process(
                                SELF IN OUT NOCOPY ORDAudio,
                                command IN VARCHAR2),
MEMBER PROCEDURE processCopy(
                                SELF IN OUT NOCOPY ORDAudio,            609
                                command IN VARCHAR2,
                                dest IN OUT NOCOPY ORDAudio),
MEMBER PROCEDURE getSegmentData(
                                segmentParams ORDSegmentExtent,
                                data IN OUT BLOB),
MEMBER PROCEDURE importWithMetaData(
                                metadataSrcType IN VARCHAR2,
                                metadataSrcLocation IN VARCHAR2,
                                metadataSrcName IN VARCHAR2),
MEMBER PROCEDURE importFromWithMetaData(
                                srcType IN VARCHAR2,                    611
                                srcLocation IN VARCHAR2,
                                srcName IN VARCHAR2,
                                metadataSrcType IN VARCHAR2,
                                metadataSrcLocation IN VARCHAR2,
                                metadataSrcName IN VARCHAR2),

```
-- the following methods facilite the initialization of interMedia objects
   MEMBER STATIC FUNCTION init() RETURN ORDAudio,
   MEMBER STATIC FUNCTION init(
                          sourceType    IN VARCHAR2,
                          sourceLocation IN VARCHAR2,
                          sourceName    IN VARCHAR2) RETURN ORDAudio,   ⎫
   MEMBER STATIC FUNCTION initFromFile(                                  ⎬ 613
                          sourceLocation IN VARCHAR2,                    ⎭
                          sourceName    IN VARCHAR2) RETURN ORDAudio
);
601
```

FIG. 6b

REPRESENTING OBJECT METADATA IN A RELATIONAL DATABASE SYSTEM

CROSS REFERENCES TO RELATED APPLICATIONS

This patent application claims priority from U.S. provisional application No. 60/166,847, Landeck, et al., *Querying complex multimedia metadata*, filed Nov. 22, 1999.

BACKGROUND OF THE INVENTION

1. Field of the Invention

The invention concerns techniques for representing object metadata generally and more particularly concerns techniques for representing object metadata in relational database systems.

2. Description of Related Art

An important task of modem computer systems is dealing with multimedia objects, that is, objects that contain representations of different kinds of information. For example, a video object that contains a digital representation of a TV newscast will include at least a video component, representing the moving image part of the program, and an audio component, representing the sound part of the program, and may also contain a closed-caption text component.

One of the many problems that arise for a computer system in dealing with multimedia objects is finding things within the multimedia object. Of course, the computer system can always begin at one end of the multimedia object and search until it finds what it is looking for, but with objects of any size, this technique simply takes too long, just as takes too long for humans to find things in books that way.

With books, the problem has been solved by adding subdivisions and using the subdivisions to find things. For example, the Christian Bible is divided into Old and New Testaments, each testament is divided into books, books are divided into chapters, and the chapters are divided into verses. In some editions of the Bible, the words of Jesus are printed in a different color from the rest of the text. A given location in the Bible is traditionally specified by book, chapter, and verse, for example, Genesis 1:1. Additionally, when the Bible is printed in book form, the pages of the book are numbered, so that one can speed the search still further by stating that the verse is on a given page of a given edition of the Bible. Various kinds of indexes make use of these subdivisions. The Bible will typically include a table of contents that indicates the page upon which each book starts and many Bibles have concordances that relate a word or term to the verses that contain or are relevant to the word or term.

The books, chapters, verses, colored text, and page numbers of the Bible are examples of metadata, that is, data that is not part of the content of the Bible, but rather serves to make it easier to locate things in the Bible. Most writings include at least some metadata, if only section headings and page numbers, and many kinds of specialized metadata have been developed for various kinds of written works.

Metadata may also be used to find things in multimedia objects. FIG. 1 shows how complex such objects may be. FIG. 1 is a representation of the various kinds of information contained in a digitized video program 101. The video program 101 is made up of a sequence of video frames 103. Within the video frames 103 are a number of different strata (105–117) of information. Some of this information is the actual content of the video; some is metadata. A stratum may further be divided into segments. One example of such segments is video clips; the video clip stratum is shown at 117; an example segment is shown at 121. Another example of a segment is a portion of speech stratum 113 containing one speaker, as shown at 123. Continuing with the other strata and beginning with keyframes stratum 105, to reduce the number of bits required to represent the video images, a number of different kinds of frames are used. Only keyframes 105 contain complete images; the other kinds of frames represent an image as changes with regard to a keyframe. CC stratum 107 is made up of closed-caption texts 107 summarizing the contents of the images and audio, so that people who cannot understand the audio portion can read the captions and determine what is going on.

Stratum 109 is annotations, for example indications of copyright ownership of various portions of the video program. The audio portion of the video program may include two strata, one, speech, 113, which actually represents music or speech, and another, audio classes 119, which indicates what the current audio track is representing. Where a speaker is speaking, there may be a speaker identification stratum 115 identifying a segment of the audio. Clips stratum 117, finally, indicates segments of the video which may be used as clips.

As is apparent from the foregoing, some of the strata, for example clips 117, are themselves metadata with regard to the video itself; each of the strata, however, may have its own metadata. Many different kinds of metadata have been used with multimedia objects; an emerging standard in the area is the Dublin Core, described in Stuart Weibel, Jean Godby, Eric Miller, and Ron Daniel, *OCLC/NSA Metadata Workshop Report*, which was published in 1995 and could be found in March, 2000 on the Internet at www.oclc.org:5046/oclc/research/conferences/metadata/dublin_core_report.html.

Dealing with multimedia objects has been a particular problem for relational database systems. First, multimedia objects are too large to be easily incorporated into relational database tables. Second, the data in them is different from that usually stored in database tables. Third, different multimedia objects may have different locations, for example in storage internal to the database system, in storage internal to the computer system the database system is executing on, or in a Web server, and the ability of the database system to deal with the object consequently cannot depend on where the object is located. These problems have been solved in the object-oriented relational database system Oracle 8™, manufactured by Oracle Corporation. Their solution is described in *Oracle8i interMedia Audio, Image, and Video User's Guide and Reference*, Part No. A67299-01, Release 8.1.5, Copyright© 1999, Oracle Corporation, which is incorporated by reference into the present patent application.

What has remained to be solved are the problems which the metadata associated with a multi-media object present for a relational database system. It has of course always been possible for an application program to use the relational database system to locate a multi-media object and then manipulate the metadata in the multi-media object. A first problem with this solution is that the application cannot use the database system's indexing and querying capabilities to deal with the metadata; a second problem is that each application must include custom code to deal with the metadata; a third is that in order for the application program to deal with the metadata, the entire object containing the metadata must be sent from the database system to the application program.

It is of course also possible for the manufacturer of a relational database to modify a relational database system to deal with particular kinds of metadata. This has been done in the DB2 Digital Library, version 2.4, manufactured by International Business Machines Corporation, where the relational database system has been modified to deal with the metadata used in multimedia workflow management. Information about the DB2 Digital Library may be found at www.software.ibm.com/dglib. The difficulty with this situation is that in a rapidly-evolving environment like that of multimedia data, the database system cannot be modified rapidly enough to keep up with the changes in the metadata.

Another approach to dealing with multimedia data, including metadata, is to permit the user to program his or her special purpose modules for the database system. This approach is exemplified by the Datablade® technology available to users of database systems produced by Informix Corporation of Menlo Park, Calif., as described in the Informix DataBlade Technology data sheet available in April, 2000 at www.informix.com/informix/products/integration/datablade/datablade_ds.htm. While this keeps the processing of the metadata and the objects containing them in the database system and does not require the user to wait for the database system manufacturer to modify the database system, it still requires that special module be built for each new kind of object to be handled by the database system. It is up to special module for a class of object to handle the object's metadata.

What is needed is techniques for dealing with metadata within the database system that are at the same time built into the database system, so that there is no need to build special modules, and flexible enough to handle all present and future kinds of metadata. It is an object of the invention described herein to provide such techniques for handling metadata.

SUMMARY OF THE INVENTION

The object of the invention is attained by providing a generic representation for metadata. The generic representation represents an item of metadata by specifying the stratum in the multimedia object to which the item of metadata-belongs, the portion of the stratum to which the item of metadata belongs, and the metadata item's value. The specification of the stratum, portion, and the metadata item's value are all done using data types that are built into the database system, and the values used in the specification may be set at runtime. The generic representation is part of the database, and consequently, metadata may be located by or used in queries like any other data in the database.

The specifier in the generic representation that specifies the portion of the stratum is termed the extent specifier. Only a relatively small number of kinds of extents are required to describe the portion of the stratum that a metadata item may apply to. The extent specifier may specify a period of time in the stratum, for example for audio data, a region of the stratum, for example for image data, or may specify a tag for a region in the stratum such as a page in a document. In addition the extent specifier may specify that the metadata item is global, i.e., applies to the entire stratum. The extent specifier for a segment contains two parts: an extent type specifier and an extent value specifier. The metadata item's value is similarly specified by a value type specifier and a value specifier.

The generic representation for metadata is employed in an object relational database system in which a multimedia object is represented in the database system's tables by a first object and the generic representation of the metadata for the multimedia object is represented by a second object that is contained in the first object. Methods for the generic representation include methods that manipulate metadata values and methods that return parts of multimedia objects specified by metadata values. Parameters for the methods allow specification of whether the method is to apply to a metadata value for a particular portion of a stratum, to a global metadata value, or a metadata value for any portion of the stratum. Methods are also provided for bulk loading of metadata values into the database.

Other objects and advantages will be apparent to those skilled in the arts to which the invention pertains upon perusal of the following Detailed Description and drawing, wherein:

BRIEF DESCRIPTION OF THE DRAWING

FIGS. 4A and 4B shows how metadata defined in the Dublin Core standard may be represented in a metadata table;

FIGS. 6A and 6B show a class definition for a metadata object.

Figure 1:
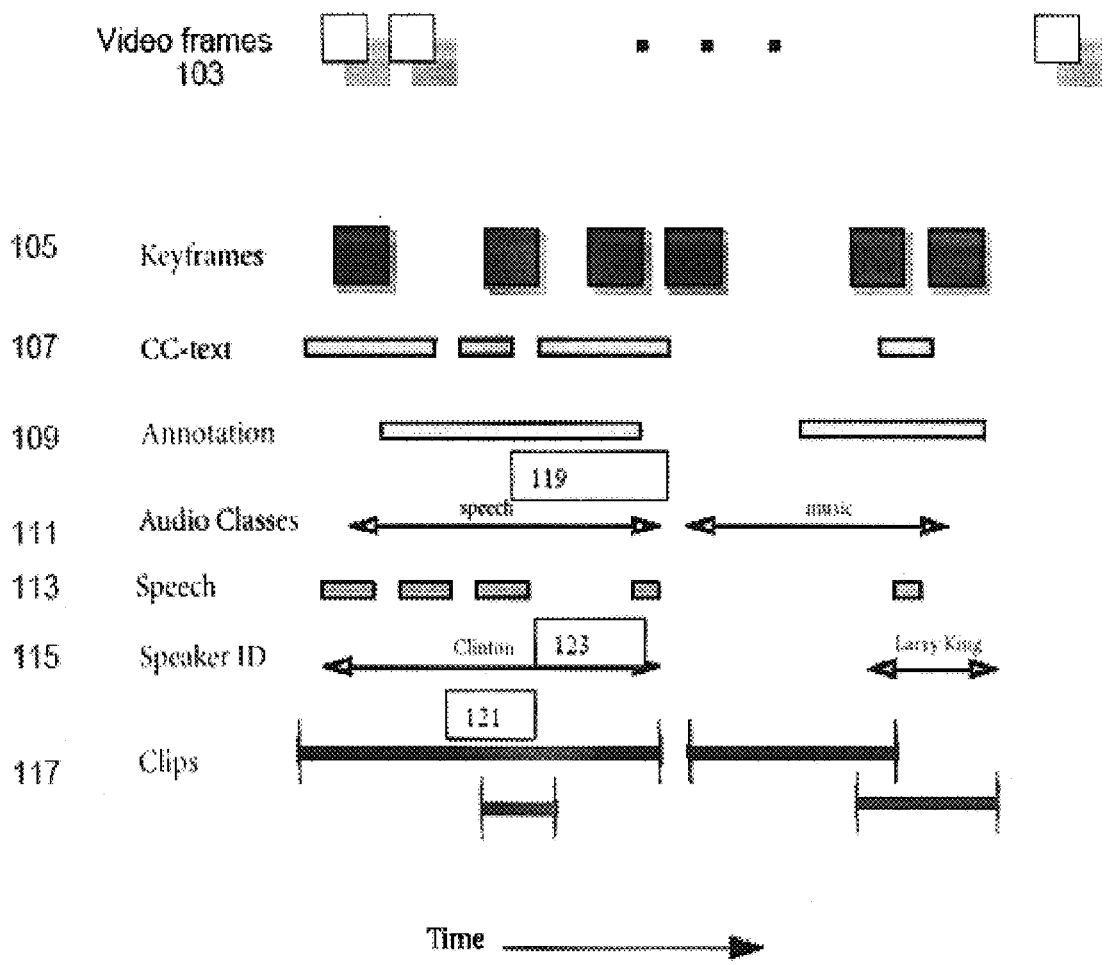
FIG. 1 is a diagram of strata and metadata in a multimedia object.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed description will first provide an overview of the techniques for representing metatadata and will than show how the techniques are implemented in the Oracle8 database system.

Overview of the Techniques: FIG. 1

The perception which underlies the techniques for representing metadata described in the following is that regardless of the actual kind of metadata, any item of metadata can be described by a <strata, extent, value> tuple, where strata identifies the stratum in the multimedia object to which the metadata applies;

extent specifies the portion of the stratum to which the metadata applies; the portion may be a segment of the stratum or the entire stratum; and value specifies the value of the metadata itself.

Thus, the item of metadata shown at 119, which identifies a portion of the audio as being speech, can be defined by its stratum, Audio Classes, its extent, shown by the line with arrows, and by its value, here, the specifier for speech audio data.

There are further only a few different kinds of extents. The extents belong to two broad groups. A segment extent indicates that the metadata applies to a particular segment in a stratum; a preferred embodiment has the following kinds of segment extents:

time, which identifies the segment to which the metadata value applies by specifying a period of time within a stratum. Time extents can be used for metadata in audio and video strata.

space, which identifies the segment to which the metadata value applies by specifying a region within a stratum. Spatial extents can be used with image strata.

tag, which identifies the segment to which the metadata applies by specifying a particular kind of tag associated with the segment. The metadata value is a value for the tag, for example, the name of the speaker in the Speaker ID stratum of FIG. 1.

page, which is a specialized tag for pages in documents. A global extent indicates that the metadata is global, i.e., it does not apply to a segment, but rather to the entire stratum. All of these extents can be expressed using built-in values in the database system. The same is true of the actual metadata, which is either numeric or character data.

Since the metadata can be represented within the database system, it can be indexed and queried like any other data in the database. The metadata can be used to make queries like the following:

Queries that, given a text metadata value, find video/audio objects. Examples:
Find all media assets in a table column with "Marketing" in the title;
Find all video assets in the column with "Preview" in the title;
Find all media assets in the column with "Rolling Stones" as the artists.

Queries that, given a text metadata value, return segments of objects specified by the metadata value:
For all objects in the column, return objects containing video clips where the closed caption for the clip contains the word "President", together with the locations of the clips in the objects;
Within a single video asset, find the locations of all scenes.

Queries that return metadata
Given a segment of a video, return all of the metadata associated with the segment.
Given an audio segment, find the video scenes contained within it.

Queries on documents
Select all documents whose editor is Jane Roe;
Select all documents which contain images where the photographer is John Doe.

Queries on images
Return the bounding polygon for the computer-generated special effects for a given animation frame;
In a LANDSAT satellite image, find all regions within 200 miles of a specified longitude and latitude whose metadata values indicate high forestation.

Figure 2:
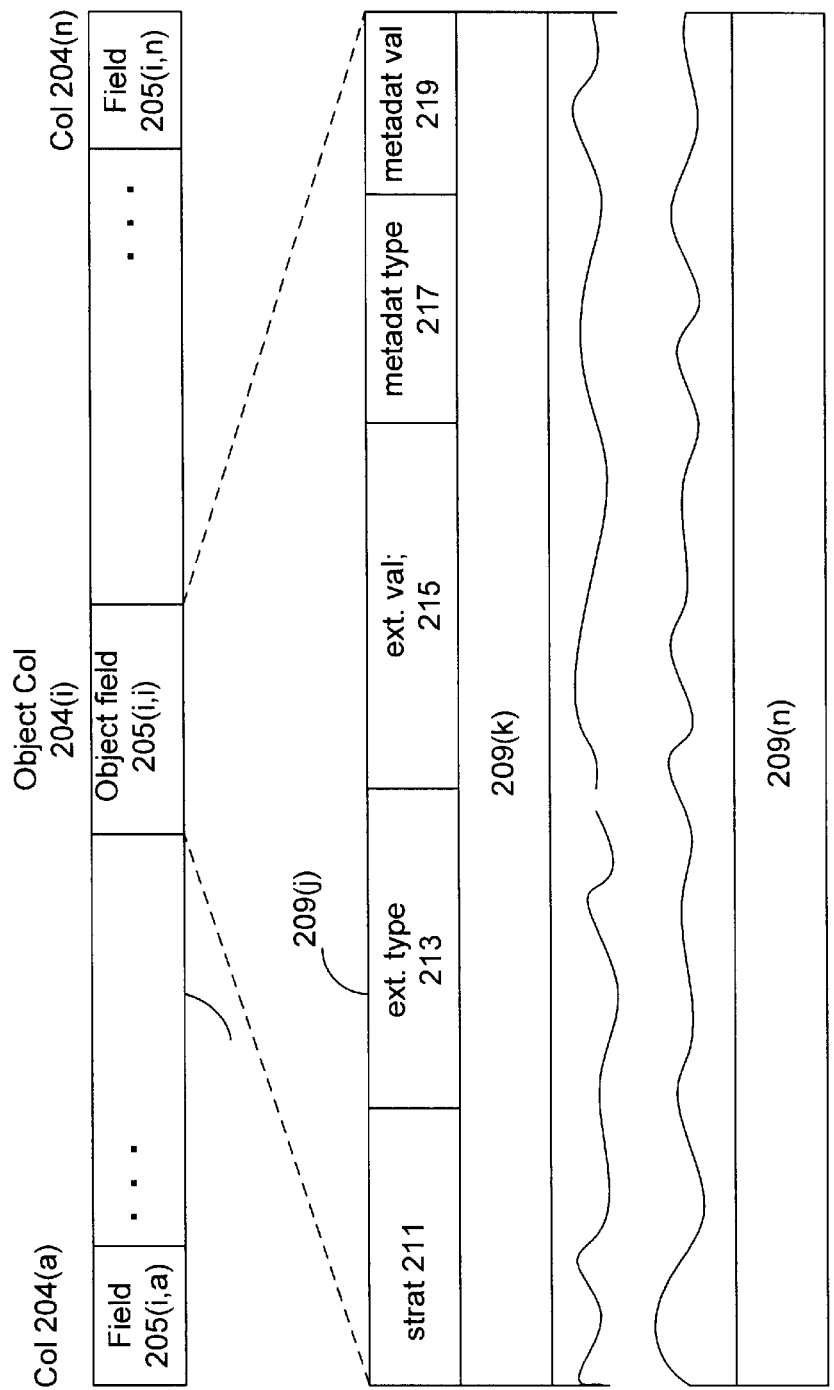
FIG. 2 shows a metadata table.

Representing Metadata in a Relational Database: FIG. 2

FIG. 2 shows a portion of a table in a relational database system such as the Oracle8 database system that can deal with multimedia objects. Tables in relational database systems have columns and rows; the intersection of a given row with a given column is termed a field. Thus, in FIG. 2, a single row $203(i)$ is shown of a database table having columns $204(a,n)$. There is a field $205(i,j)$ corresponding to each of the columns. The field that is of particular interest here is object field $205(i,i)$. All of the fields in this column represent multimedia objects. Associated with each such object field is a metadata table 207 which contains the metadata for the object represented by the object field.

The metadata table 207 for object field $205(i,i)$ is shown in FIG. 2. There is a row 209 in metadata table 207 for each metadata item in the object. The values in the fields in a given row $209(i)$ of the table specify the <stratum,extent, value> tuple for the metadata item. Field 211 specifies the stratum to which the metadata value belongs, field 213 specifies the kind of extent the metadata item has, field 215 contains the value(s) that define the metadata item's extent, field 217 contains the type of the metadata's value, and field 219 contains the value itself. Thus, if object field $205(i,i)$ represents a video object and row $209(i)$ represents a CC text metadata item in the video object, stratum field 211 will specify CC text stratum 107, extent type field 213 will specify a temporal extent, extent value field 215 will specify the start and end times for the segment of the video object to which the closed caption applies, metadata type 217 will specify character data, and metadata value 219 will be the closed caption itself.

All of the fields in metadata table 207 have value types which are built-in in the database system. In a preferred embodiment, the value of a stratum field 211 is a character string specifying the name of the stratum; the value of an extent type field 213 is a character string specifying one of the extent types described above. The extent value depends on the extent type; for time extents it is a pair of integers, one representing the starting time in nanoseconds and the other the ending time in nanoseconds. For spatial extents it may be the centroid of a portion of an image. For tag extents, the extent is the tag's name and an occurrence number for the tag. For page extents, the extent is the starting and ending page numbers, with the offset of the start and end within the pages. The metadata value type in field 217 is a character value; depending on the type in field 217, the metadata values in field 219 may be numerical or character values.

Metadata table 207 has a number of important advantages over other techniques for handling metadata.

The representation of a metadata item by the <stratum, extent, value> tuple and the fields that represent the tuple in metadata table 207 are both completely generic; all present and future kinds of metadata can be represented by rows in metadata table 207; thus, only the definition of metadata table 207 itself need be built into the database system, not the definitions of the individual kinds of metadata.

All metadata items are completely defined by field values in metadata table 207, and definitions of metadata items can thus be changed at runtime.

Since metadata is defined using standard database data types, when an object has a new kind of metadata, an application program that manipulates the object can define a stratum name for the new metadata, can define the item's extents, and can define the item's value and then make rows in table 207 that use the definitions.

Figure 3:
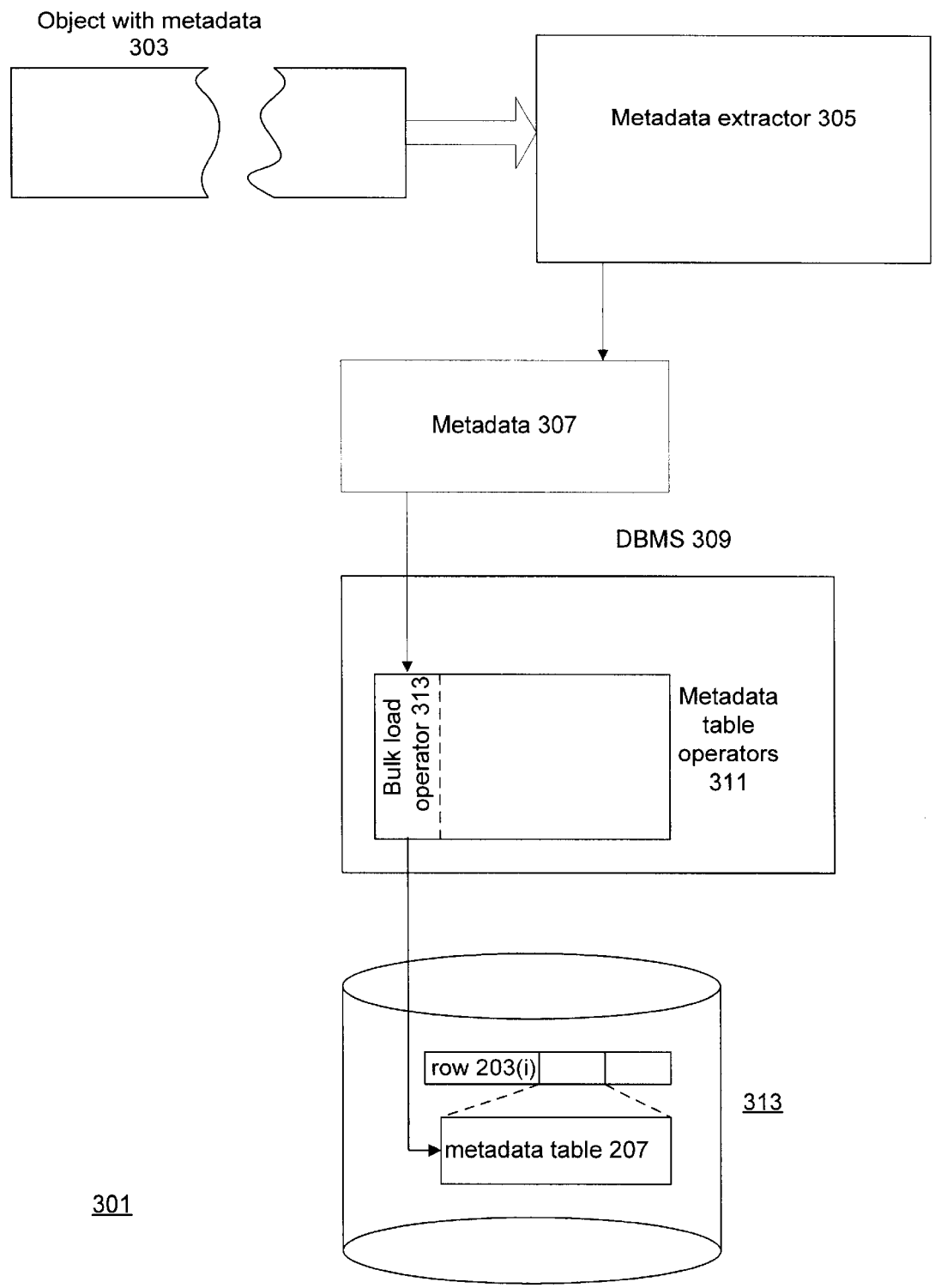
FIG. 3 shows how a metadata table is populated.

Populating Metadata Table 207: FIG. 3

Any operation that can be performed on a table in the relational database system to which metadata table 207 belongs can of course be performed on metadata table 207; thus, rows 209 can be updated, added to table 207, or deleted from table 207. However, when an object is being added to a database table, there is a need for a faster way of populating metadata table 207 than doing it one row at a time. FIG. 3 shows how a metadata table 207 is populated in bulk. An object 303 which contains metadata or from which metadata can be produced is read by metadata extractor 305, which extracts (or produces) the metadata 307. A number of such metadata extraction or production tools are available. Examples are the Virage Videologger, made by Virage, Inc., the Excalibur Video Analysis Engine, made by Excalibur Technologies, Corp., and Bulldog Two.Six, made by Bulldog Group, Inc. Metadata 307 is typically organized as a set of extents and a set of metadata values, with the metadata value having the same position in its set as the value's extent has in its set.

The metadata is stored in a location which is accessible to database management system 309, which manipulates database tables stored in persistent storage 313. DBMS 309 includes a number of operators 311 for metadata table 207, and included in these operators are bulk load operators 313. A bulk load operator 313 reads metadata 307 and adds it to metadata table 207.

Detailed Example of Representation of Metadata: FIG. 4

FIG. 4 is a table which shows how metadata defined in the Dublin Core standard for metadata for documents may be expressed using the <stratum,extent,value> tuples employed in metadata table 207. Table 401 has a row 403 for each of the kinds of Dublin Core metadata and four columns: column 405 specifies the name used in stratum field 211, column 407 specifies the extent type used in field 213, column 409 specifies the metadata value type used in field 217, and column 411 explains the meaning of the metadata value. There is no column corresponding to extent value 215 because all of the Dublin Core metadata in the table applies to the entire document and consequently has global extent.

Figure 5:
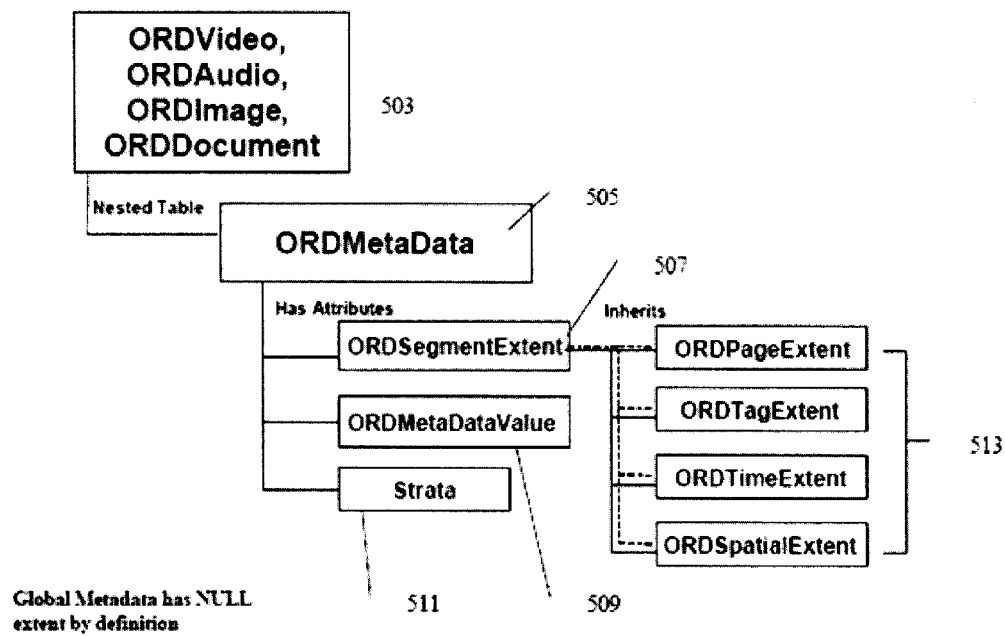
FIG. 5 shows the class hierarchy for metadata objects in a preferred embodiment.

Implementation of Metadata Table 207 in a Preferred Embodiment: FIGS. 5–6

A preferred embodiment of metadata table 207 is implemented in the Oracle 8i database system. As described in *Oracle8i interMedia Audio, Image, and Video User's Guide and Reference*, Part No. A67299-01, Release 8.1.5, Copyright© 1999, Oracle Corporation, the Oracle 8i database system represents media objects by means of objects having the built-in ORDVideo, ORDAudio, ORDImage, and ORDDocument classes. In the preferred embodiment, a class for objects representing metadata tables 207 has been added to the ORDVideo, ORDAudio, ORDImage, and ORDDocument classes. This class is termed the ORDMetadata class. FIG. 5 shows the relationship between the ORDMetadata class and the ORDVideo, ORDAudio, ORDImage, and ORDDocument classes on the one hand and the classes for the data used to represent the metadata in table 207 on the other. In class hierarchy 501, objects of the ORDVideo, ORDAudio, ORDimage, and ORDDocument classes 503 may include objects of the ORDMetadata class 505. ORDMetadata class 505 has attributes of the Strata 511, ORDSegmentExtent 507, and ORDMetadataValue 509 classes. These attributes together specify a metadata item by means of a <stratum,extent,value> tuple. Each ORDSegmentExtent attribute 507 inherits one of the ORDPageExtent, ORDTagExtent, ORDTimeExtent, or ORDSpatialExtent classes, depending on the kind of extent values required for the extent. If the extent is global, it of course has no extent values and inherits none of classes 513.

FIG. 6 shows a declaration 601 for an object metaData (603) of class ORDMetadata. There follow the interfaces for the methods for the class. At 605 are listed the interfaces for the methods for adding a metadata item to the object (i.e., adding a row to metadata table 207), selecting metadata items from the object (i.e., selecting rows from the table), deleting metadata items (i.e., deleting rows), and updating metadata items (i.e., updating rows). At 607 are listed the interfaces for the methods for adding or updating a set of metadata items for a stratum. The support methods at 609 are specific to the classes that ORDMetaData is a component of identifyformat reads the format of an object from the object; process and processCopy specify plugins in the database system that perform arbitrary processing on a media object, with processCopy performing the processing on a copy of the original object. getSegmentData takes parameters that identify a segment of an object and returns the segment. The methods at 611 import an object into the database system along with its metadata; the metadata may be in a different location (as shown for example at 307 in FIG. 3) from the object. importWithMetaData imports a media object from a location specified by attributes in the ORDVideo, ORDAudio, ORDImage, or ORDDocument object to which the ORDMetadata object belongs and imports the metadata from the location specified in the method's parameters. importFromWithMetaData does the same, except that the method's parameters also specify the location of the media object. The methods at 613, finally, are used to initialize a blank media object.

The methods for the interfaces specified above may of course be implemented in many different ways. Each class of multimedia object will have its own set of methods, with the methods for a particular class working as required for the metadata of that class of multimedia object. When a new class of multimedia object appears, it may be integrated into the ORDMetadata class framework simply by writing methods for the class that obey the interfaces of FIG. 6.

Details of the ORDMetadata Class

As shown in FIG. 5, the ORDMetadata class has the StrataName, extent, and value attributes. The latter two attributes have the ORDSegmentExtent, and ORDMetaDataValue classes. The class and its attributes are specified in detail in the following class definitions and associated discussions:

ORDMetaData

```
create type OrdMetaDataElement as object(
    strataName    varchar2(40),
    extent        OrdSegmentExtent,
    value         OrdMetadataValue);
create type OrdMetaData as table of OrdMetaDataElement;
```

ORDMetaData is a collection of ORDMetaDataElements. These have the following types:

ORDSegmentExtent

```
create type ORDSegmentExtent ( type VARCHAR2 (20));
```

The above definition represents the base segment type. A value of the type must be one of the following VARCHAR2 values:

```
{ 'TIME_EXTENT', 'SPATIAL_EXTENT', 'TAG_EXTENT',
'PAGE_EXTENT', 'GLOBAL_EXTENT', 'ANY_SEGMENT_
EXTENT'}
```

The ANY SEGMENT EXTENT value may be a value indicating any of the segment extent types. Thus, when ANY SEGMENT EXTENT is specified in an interface, the programmer may provide a value indicting any of the segment extent types.

ORDTagSegmentExtent

The tag based (logical) extent will be as follows:

```
create type ORDTagSegmentExtent as object (is
ORDSegmentExtent) (
    tagName VARCHAR2,
    tagOccurenceNumber INTEGER
)
``` where the tagName is the name of the tag to which the metadata is associated. The tagOccurenceNumber is the sequence number of occurrence of that tag within the document. The first occurrence will be 1, the second occurrence 2 as so on. A tag extent is a logical partition of the document associated with a certain tag of the document. As the name suggested it is applicable to the tag based documents like XML and HTML documents. An example of a tag extent for a HTML document will be as follows: ORDTagSegmentExtent ('TAG_EXTENT', 'IMG', 3) refers the third IMG (image) tag inside the HTML document.

ORDPageSegmentExtent

The page-based (physical) extent will be as follows:

```
create type ORDPageSegmentExtent as object (is
ORDSegmentExtent) (
    startPageNumber INTEGER,
    startPageOffset INTEGER,
    endPageNumber INTEGER,
    endPageOffset INTEGER
)
```

Where: startPageNumber is the starting page of the page extent, and startPageOffset is the starting offset within the starting page, endPageNumber is the ending page of the page extent, and endPageOffset is the ending offset within the ending page.

A page segment is a logical partition of the document extending over a certain number of pages. An example of a page extent for a Microsoft doc file is ORDPageSegmentExtent (1,NULL, 10, NULL) which represents from page segment 1 through 10 of the doc file. ORDPageSegmentExtent ('PAGE_EXTENT', 11, NULL, 20, NULL) refers to the 11$^{th}$ through 20$^{th}$ pages of the specified document.

Note : in case the font size or the content of the document changes, the metadata is be invalidated and re-populated (either automatically or manually)

ORDSpatialSegmentExtent

The spatial based extent will be as follows:

```
create type ORDSpatialSegmentExtent as object (is
ORDSegmentExtent) (
    shape MDSYS.SDO_MDR
)
```

This object stores information about one spatially based segment extent. For example the strataName could be 'image centroids', the extent could refer to a point defined as MDSYS.SDO_GEOMETRY(1, NULL, MDSYS.SDO_POINT (.2000, .3000, NULL), NULL, NULL) and the value could be 'dolphin' (i.e. value. varCharVal='dolphin'). This captures the information that the centroid for the 'dolphin' image is found 20% in from the left of image and 30% up from the bottom of the image.

ORDTimeSegmentExtent

```
CREATE TYPE ORDTimeSegmentExtent AS OBJECT(is
ORDSegmentExtent) (
        -- ATTRIBUTES
    start              INTEGER,      -- Starting time
    value in nanoseconds
    end                INTEGER,      -- Ending time
    value in nanoseconds
    start_native       VARCHAR2(4000),  -- Starting
    native value (comment)
    end_native         VARCHAR2(4000)   -- Ending
    native value (comment)
);
```

This object stores information about one time based segment extent. The extent could refer to a video clip from the 01:54:05:02-01:54:23:27 mark of the video and the metadata value for the ORDMetaData object could be the VARCHAR2 value 'and in other news tonight' (i.e. value.varCharVal='and in other news tonight'). This captures the information that the close captioning specified for this video clip is 'and in other news tonight'.

ORDTimeSegmentExtent ('TIME_EXTENT', 43000000, 46000000, '01:54:05:02', '01: 54:23:27') specifies a video segment with nanosecond offsets 43000000 and 46000000 represented by comments '01:54:05:02' and '01:54:23:27'.

Alternative if Inheritance is Not Available

If ORDSegmentExtent cannot inherit the type of extent that it represents, it can be declared as follows, with the type being dependent on the value of the type attribute:

```
create type ORDSegmentExtent (
    type            VARCHAR2(20),
    timeExtent   ORDTimeSegmentExtent,
    spatialExtent    ORDSpatialSegmentExtent,
    tagExtent     ORDTagSegmentExtent,
    pageExtent    ORDPageSegmentExtent,
)
```

No Inheritance Example

This following example shows how information is stored about a single page-based metadata element where the extent type is not specified by inheritance. The extent specification contains a strataName, the extent information and the metadata value. For example the strataName could be reviewer, the extent could refer to the page 11 to 20 within the document (ORDSegmentExtent ('PAGE_EXTENT', NULL, NULL, NULL, ORDPageSegmentExtent (11, NULL, 20, NULL) ), and the value could be 'X' (i.e. value.type='VARCHAR_VAL' and value. varCharVal= 'X'). This captures the information that the reviewer of page 11 to 20 of the document is 'X'.

ORDMetaDataValue

```
CREATE TYPE OrdMetaDataValue (type VARCHAR2(20);
```

The following definition represents the base metadata value definition.

```
CREATE TYPE OrdMetaDataNumValue AS OBJECT (IS
OrdMetaDataValue) {
    val NUMBER;
}
``` and similar specifications for the other type of Oracle types. The above specification assumes the support of inheritance from the kernel object model. Where inheritance is not supported, aggregation may be used as follows:

```
CREATE TYPE OrdMetaDataValue AS OBJECT (
    type VARCHAR2(20);
    numVal NUMBER;
    intVal INTEGER;
    charVal CHAR;
    varCharVal VARCHAR(4000);
    blobVal BLOB;
```

```
    clobVal CLOB;
    imageSignature ORDImgSig;    
    ....
);
The type field is one of the following string values:
{'NUM_VAL', 'INT_VAL', 'CHAR_VAL', 'VARCHAR_VAL',
'BLOB_VAL', 'CLOB_VAL', 'DATE_VAL', 'IMGSIG_VAL'}
```

Implementation of ORDMetaData Value

There are 4 alternatives to implementing this type. If object inheritance is available, it will provide the simplest and most powerful solution: metadata values can be of any user defined type. In the absence of inheritance, this object class can be implemented as a union of a fixed list of data types, either by having attributes of the above list of types or by requesting that a more space efficient structure be implemented.

Alternative 1: Union Construct is Available

```
CREATE TYPE ORDMetaDataValue AS UNION {
    numVal NUMBER,
    charVal VARCHAR2(4000),
    dateVal DATE,
    ....
};
```

Alternative 2: No Inheritance or Union

```
CREATE TYPE ORDMetaDataValue AS OBJECT{
    type VARCHAR(20);
    numVal NUMBER;
    intVal INTEGER;
    charVal CHAR;
    varCharVal VARCHAR(4000);
    blobVal BLOB;
    clobVal CLOB;
    imageSignature ORDImgSig; 
    ....
};
```

Alternative 3: Inheritance but no Indexing of Subclasses

This is simply a hybrid of alternative 2 and the inheritance model.

Examples of Queries that are Enabled by Metadata Objects

1. Query on any given text attribute retrieves the corresponding video/audio object.

Find all video (only) assets in a column of a table with "preview" in the title.

```
SELECT dt.video.source.localData
FROM userDocTable dt, (dt.metaData) n
WHERE n.strataName = 'title' and
    n.value.varcharVal = 'preview' and
    n.value.type = 'VARCHAR_VAL' and
    n.extent.type = 'GLOBAL_EXTENT';-- Global Extent
```

2. Query on any given text attribute retrieves the particular segment of the audio/video object.

Find the asset and starting and ending SMPTE time code of all video clips where the closed caption content contains the word "president"

```
SELECT dt.video.source.localData,
    n.extent.start.smpte(), n.extent.end.smpte()
FROM userDocTable dt, (dt.metaData) n
WHERE n.strataName = 'closed caption' and
    n.value.varCharVal = 'president' and
    n.extent.type = 'TIME_EXTENT';
```

Within a single video asset, find all of the starting and ending SMPTE time codes of video scenes (determined by a scene change detector)

```
SELECT n.extent.start.smpte(), n.extent.end.smpte()
FROM userDocTable dt, (dt.metaData) n
WHERE dt.AssetID = 273 and
    n.strataName = 'oracle scene change' and
    n.extent.type = 'TIME_EXTENT';
```

Within a single video asset, find all of the starting and ending SMPTE time codes of audio change clips (determined by an audio change detector)

```
SELECT n.extent.start.smpte( ), n.extent.end.smpte( )
FROM userDocTable dt, (dt.metaData) n
WHERE dt.AssetID = 273 and
    n.strataName = 'oracle audio change' and
    n.extent.type = 'TIME_EXTENT';
```

Within a single audio asset, find the starting and ending time value, in milliseconds, of the audio clips where speaker A is speaking

```
SELECT n.extent.start * 1000000, n.extent.end *
1000000
FROM userDocTable dt, (dt.metaData) n
WHERE dt.AssetID = 273 and
    n.strataName = 'speaker' and
    n.value.varCharVal = 'A' and
    n.value.type = 'VARCHAR_VAL' and
    n.extent.type = 'TIME_EXTENT';
```

For a single audio asset, find the starting and ending time value, in seconds, of the entire audio asset.

3. Given a segment of media data, retrieve the metadata (incl. key frames)

Given a video segment id (from some previous query), find all metadata types and ids associated with it (i.e. any segmented metadata from segments that are contained within, or overlap right or overlap left the segment in our where clause.)

4. Given a pointer to a segment of video in format X, retrieve it in format Y where X and Y in {tape, disk, server}.

Find a single asset in Motion-JPEG format and convert it to QuickTime.

```
DECLARE
    obj ORDSYS.ORDVideo;
BEGIN
    SELECT dt.value into obj
    FROM userDocTable dt
```

-continued

```
        WHERE
            dt.AssetID = 273 AND
            dt.value.format = 'MJPEG'
            FOR UPDATE;
            obj.process('fileFormat=MOV');
        UPDATE userDocTable
        SET value = obj
        WHERE
            dt.AssetID = 273 AND
            dt.value.format = 'MJPEG';
    END;
```

5. Temporal queries on segments involving interval relations like overlap, touch, disjoint, before, after.

Within a single video asset, find the video scenes contained within a single audio change clip (specified by either bounding SMPTE time code or by some unique id on the segments (if it exists)

```
SELECT n1.extent.start.smpte( ),
    n1.extent.end.smpte( ), n2.extent.start.smpte( )
        n2.extent.end.smpte( )
FROM userDocTable dt, (dt.metaData) n1,
(dt.metaData) n2
WHERE n1.strataName = 'video scene change' and
    n2.strataName = 'audio scene change' and
    n1.extent.type = 'TIME_EXTENT' and n2.extent.type
        = 'TIME_EXTENT' and
    n1.value.type = 'VARCHAR_VAL' and n2.value.type =
    'VARCHAR_VAL' and
    n2.extent.contains(n1.extent);
```

Within all audio assets in a table, find the asset and starting and ending time value, in milliseconds, of the audio clips where speaker A and speaker B are speaking to each other (i.e. the A and B clips contact or overlap each other)

```
SELECT dt.audioColumn.source.localData,
    n1.extent.start * 1000000,
        n1.extent.end * 1000000
FROM userDocTable dt, (dt.metaData) n1,
(dt.metaData) n2
WHERE n1.strataName = 'speaker' and n2.strataName =
'speaker'
    and n1.value.varCharVal = 'A' and
    n2.value.varCharVal = 'B'
    and n1.extent.type = 'TIME_EXTENT' and
    n2.extent.type = 'TIME_EXTENT'
    and n1.value.type = 'VARCHAR_VAL' and
    n2.value.type = 'VARCHAR_VAL'
    and n1.extent.contains(n2.extent)
```

7. Document Queries

For all of these document queries it is assumed that a series of documents have been stored in the column of a table DocumentTable.docColumn and that annotation has occurred on this data to populate metadata. For example, the Media Annotator could be used to identify author, title, copyright, editor etc. information about the whole document and about portions of the document.

Select all the documents whose editor is 'Bob' from DocumentTable (all extents).

The SQL query is as follows:

```
SELECT t.docColumn.source.localData
FROM DocumentTable t, TABLE(t.metaData) n
WHERE n.strataName = 'editor' and
    n.value.varCharVal = 'Bob' and
    n.extent.type = 'GLOBAL_EXTENT' and
    n.value.type = 'VARCHAR_VAL';
``` where: DocumentTable is the user table containing the ORDDocument object, docColunm is the column in DocumentTable which is of type ORDDocument.In this case 'editor' is a strata in the metadata field and 'Bob' is the value of the metadata. The user could build an index on the strataName field as well as the value.varCharVal field to get better performance.

Select all the documents whose author from page 1 to page 10 is 'Ramu' from

```
SELECT t.docColumn.source.localData
FROM DocumentTable t, TABLE(t.metadata) n
WHERE n.strataName = 'author' and
    n.extent.startPageNumber = 1
        and n.extent.endPageNumber = 10
        and n.value.varCharVal = 'Ramu'
        and n.extent.type = 'PAGE_EXTENT'
        and n.value.type = 'VARCHAR_VAL';
``` where: DocumentTable is the user table containing the ORDDocument object, and docColumn is the column in which the document lies in the DocumentTable. This query assumes that the DocumentTable has a docColumn of type ORDDocument which has a metadata strata of 'author' for the various page segment extents of the document. In this case 'author' is a strata in the metadata field and 'Ramu' is the value of the metadata. The user could build an index on the strataName field as well as the value.varCharVal field to get better performance Select all the documents which have an IMG (tag) which is photographed by 'Chan' from DocumentTable. The SQL query is as follows:

```
SELECT t.docColumn.source.localData
FROM DocumentTable t, TABLE(t.metadata) n
WHERE n.strataName = 'photographer' and
    n.extent.tagName = 'IMG' and
    n.value.varCharVal = 'Chan' and
    n.extent.type = 'TAG_EXTENT' and
    n.value.type = 'VARCHAR_VAL';
``` where: DocumentTable is the user table containing the ORDDocument object, and docColumn is the column in which the document lies in the DocumentTable. This query assumes that there is a 'photographer' strata for the different IMG tag segment extents of the document. In this case 'IMG' is a strata in the metadata field and 'Chan' is the value of the metadata. The user could build an index on the strataName field as well as the value.varCharVal field to get better performance.

Details of the Methods for Metadata Objects

In the following, a detailed description is presented of each of the methods used to manipulate objects belonging to the ORDmetadata class. The discussion begins with a description of the ways of designating extents in the methods.

Specifying Portions of a Stratum in Method Parameters

In method parameters, a given segment of a stratum can be specified by a <strata, extent> tuple. In addition, there are two constants for specifying that the method is to be applied with regard to global metadata only or that the method is to be applied to metadata contained in segments only. The constants are "GLOBAL_ONLY" and "SEGMENT_ONLY". These can be used in the API's in place of the extent portion of the <strata, extent> tuple. The constants are defined as follows:

---
CREATE OR REPLACE PACKAGE ORDConstants AS
-- Exceptions for all audio sources
GLOBAL_ONLY CONSTANT ORDSegmentExtent :=
    ORDSegmentExtent('GLOBAL_EXTENT', NULL, NULL, NULL, NULL);
SEGMENT_ONLY CONSTANT ORDSegmentExtent :=
    ORDSegmentExtent('ANY_SEGMENT_EXTENT', NULL, NULL, NULL, NULL);
END ORDConstants;

---

These values can, where valid, give the user four different ways of specifying what portion of a stratum an UPDATE, a DELETE, or a SELECT method will operate on.
1. Specifying the extent—If the extent is specified, then the method will only work on a segment in the stratum that is exactly specified by the provided extent.
2. Leaving extent NULL—If the extent is NULL, the method will work on all metadata in the stratum regardless of whether the metadata is global or for a segment. This is the "wildcard" situation.
3. Specifying "GLOBAL_ONLY"—If ORDSYS.ORDConstants.GLOBAL_ONLY, is specified, the method will work on all global metadata for the stratum and ignore all metadata for individual segments.
4. Specifying "SEGMENT_ONLY"—if ORDSYS.ORDConstants.SEjMENT_ONLY is specified, the method will work on all metadata for individual segments of the stratum and will ignore all global metadata for the stratum.

InsertMetaData( ) Member Procedure
Format

---
MEMBER PROCEDURE insertMetaData (
    strataName IN VARCHAR2,
    segmentValue IN ORDMetaDataValue,
    segmentExtent IN ORDSegmentExtent)

---

Description
  Allows the programmer to insert a single metadatal value into an object, within a specified strata and for a given segment extent or for a global segment.
Parameters
  strataName
    Refers to the name of the strata into which metadata is to be inserted, for example 'author' strata refers to all the authors of different segments of a document This parameter is REQUIRED.
  segmentValue
    Refers to the metadata value associated with this segment. This parameter is REQUIRED
  segmentExtent
    Refers to the extent information to which the metadata is related for example it could refer to the first image tag of the document. This parameter is OPTIONAL. If this parameter is not specified or is specified NULL, then the metadata to be added has Global extent.
Usage
  This is to be used by applications that are adding single points of metadata to the object specified.

InsertSegmentMetaDataInBulk( ) Member Procedure
Format

---
MEMBER PROCEDURE insertSegmentMetaDataInBulk(strataName
    IN VARCHAR2,
    segmentValueSet IN ORDMetaDataValueSet,
    segmentExtentSet IN ORDSegmentExtentSet);

---

Description
  This method performs a bulk insert of segment metadata for a single strata.
Parameters
  strataName
    Refers to the name of the strata into which the metadata is to be inserted in bulk, for example 'author' strata refers to all the authors of different segments of a document This parameter is REQUIRED.
  valueSet
    Refers to the metadata set to be associated with the tag segment extent set specified in the second parameter. This parameter is REQUIRED. The invoker is responsible for matching the correct segment extent with the metadata value. For example the first segment extent element in the segment extent set (which is the second parameter) should have metadata stored in the first metadata value in the metadata set (which is the third parameter).
  segmentExtentSet
    Refers to the extent set information whose metadata will be updated. This parameter is REQUIRED.
Usage
  This is to be used by applications that are performing inserts of large amounts of segmented metadata.

SelectMetaData( ) Member Function
  Format

---
MEMBER FUNCTION ORDMetaDataResult selectMetaData(
    strataName IN VARCHAR2,
    segmentExtent IN ORDSegmentExtent)

---

Description
  Allows the programmer or ad hoc user to perform simple queries based on presented parameters
Parameters
  strataName
    refers to the name of the strata from which the metadata is to be selected, for example 'author' strata refers to all the authors of different segments of a document. This parameter is OPTIONAL. In case it is not specified then the metadata values corresponding to the segment extent in the second parameter will be returned. In case the second parameter is also not specified then all the segmented metadata value(s) will be returned.
  segmentExtent
    Refers to the extent information to which the metadata is related, for example it could refer to the first image tag of the document. This parameter is OPTIONAL. In case it is omitted or NULL then all of the metadata values related to the strataName (the first parameter) will be selected for all extents. ORDSYS.ORDConstants.GLOBAL_ONLY and ORDSYS.ORDConstants.SEGMENT_ONLY are also valid parameters. See the discussion of how extents are specified above for more information on these parameters.

return ORDMetaDataResult

A set of metadata values whose type is defined as follows:

```
CREATE TYPE ORDMetaDataResultSet { VARRAY of
    ORDMetaDataValue[32767]; };
```

Usage

This is used to perform simple queries of the metadata within a single object. If strataName is left NULL, then the values for all strata are returned for the given extent.

If the segmentExtent value is left NULL then all segment extent values are returned for the input strata.

DeleteMetaData( ) Member Procedure
  Format

```
MEMBER PROCEDURE deleteMetaData (
    strataName IN VARCHAR2,
    segmentValue IN ORDMetaDataValue,
    segmentExtent IN ORDTimeSegmentExten)
```

Description

Allows the programmer or ad hoc user to delete segmented metadata for a given object.

Parameters
  strataName
    refers to the name of the stratum in which metadata is to be deleted, for example 'author' strata refers to all the authors of different segments of a document This parameter is OPTIONAL. In case it is not specified or NULL, then all the tag segment extents corresponding to the second parameter will be deleted. In case segmentExtent is also not specified then all the segment metadata in both tag and page based segment metadata nested tables will be deleted.
  segment Value
    refers to the metadata associated with this segment
  segmentExtent
    refers to the extent information to which the metadata is related for example it could refer to the first image tag of the document. This parameter is OPTIONAL. In case it is NULL then all the metadata values related to the strataName (the first parameter) will be deleted for all global and segmented items of metadata. In case strataName is also not specified then all the segment and global metadata in both tag and page based segment metadata nested objects will be deleted. ORDSYS.ORDConstants.GLOBAL_ONLY and ORDSYS.ORDConstants.SEGMENT_ONLY are also valid parameters. See the discussion of how extents are specified above for more information on these parameters.

Usage

This is used to remove specific pieces of metadata from an object. If all three parameters are specified, then just the qualifying metadata will be deleted.

Any or all of the parameters are optional. If the value of NULL is used for all three parameters, then the object will have all segmented and global metadata removed. Note that to leave global metadata untouched, simply specify deleteMetaData(NULL, NULL, SEGMEN_ONLY);

UpdateMetaData( ) Member Procedure
  Format

```
MEMBER PROCEDURE updateMetaData(
    strataName IN VARCHAR2,
    oldSegmentValue IN ORDMetaDataValue,
    newSegmentValue IN ORDMetaDataValue,
    segmentExtent IN ORDTimeSegmentExtent)
```

Description

Allows the programmer or ad hoc user to update individual segmented metadata elements within an object.

Parameters
  strataName
    refers to the name of the strata in which the metadata is to be updated, for example 'author' strata refers to all the authors of different segments of a document This parameter is REQUIRED.
  oldSegmentValue
    refers to the old metadata associated with the segment to be updated. This parameter is REQUIRED.
  newSegment Value
    refers to the new metadata to be associated with the segment to be updated. This parameter is REQUIRED
  segmentExtent
    refers to the extent information to which the metadata is related for example it could refer to the first image tag of the document. This parameter is OPTIONAL. In case it is NULL then all the metadata values which are equal to the oldValue AND related to the strataName (the first parameter) will be updated to the new value. Refers to the old metadata associated with all segmented and global metadata that is to replaced. ORDSYS.ORDConstants.GLOBAL_ONLY and ORDSYS.ORDConstants.SEGMENT_ONLY are also valid parameters. See the discussion of how extents are specified above for more information on these parameters.

Usage

This procedure requires all parameters specified except segmentExtent.

UpdateSegmentMetaDataInBulk( ) Member Procedure
  Format

```
MEMBER PROCEDURE updateSegmentMetaDataInBulk( strataName
IN VARCHAR2,
    oldValueSet IN ORDMetaDataValueSet,
    newValueSet IN ORDMetaDataValueSet,
    segmentExtentSet IN ORDSegmentExtentSet);
```

Description

This method performs a bulk update of tag segment extent metadata

Parameters
  strataName
    refers to the name of the strata in which the metadata is to be updated, for example 'author' strata refers to all the authors of different segments of a document This parameter is REQUIRED.
  oldValueSet
    refers to the old metadata set associated with the segment extent set specified in the second parameter. This parameter is REQUIRED.

newValueSet
refers to the new metadata set to be associated with the segment extent set specified in the second parameter. This parameter is REQUIRED.
segmentExtentSet
refers to the extent set information whose metadata will be updated.
This parameter is REQUIRED.

GetSegmentData( ) Member Procedure

Format

```
MEMBER PROCEDURE getSegmentData(
    segmentParams ORDSegmentExtent,
    data IN OUT BLOB)
```

Description

This is the interface to return a segment if inheritance is supported. Different subclasses of ORDSegmentExtent are passed in as a parameter. The segmentParams are the segment identifying parameters which are format specific. Given the segment parameters this method will return the corresponding segment data as the data parameter which is of type BLOB. For example for a XML document the segment parameter could be tag name and the tag occurrence number. This method is intended to return the corresponding segment information. This method will invoke the corresponding implementation in the appropriate format plug-in. The third parties are expected to implement this method in format plug-ins If there is no inheritance, different getSegmentData APIs are used for different extent types.

```
MEMBER PROCEDURE getSegmentData(
    segmentParams IN ORDSegmentExtent,
    data IN OUT NOCOPY BLOB)
MEMBER PROCEDURE getSegmentData(
    segmentParams IN RAW (4000),
    data IN OUT NOCOPY BLOB)
```

The last API above will handle the cases where getSegmentData would need some parameters which are not captured within our segment extent types.

Parameters
segmentParams
refers to the extent set information for the clip to be returned. This parameter is REQUIRED.
data
The BLOB location to have the newly created segment placed. This parameter is REQUIRED.

ImportWithMetaData( ) Member Procedure

Format

```
MEMBER PROCEDURE importWithMetaData(
    metadataSrcType IN VARCHAR2,
    metadataSrcLocation IN VARCHAR2,
    metadataSrcName IN VARCHAR2);
```

Description

This imports the document data from the srcType, srcLocation and srcName field within the source attribute of the document and the metadata from the metadataSrcType, metadataSrcLocation, metadataSrcName, which are specified as parameters. This metadata is in the form of a recognized metadata standard, such as the Dublin Core standard.

Parameters
metadataSrcType
This parameter is REQUIRED.
metadataSrcLocation
This parameter is REQUIRED.
metadataSrcName
This parameter is REQUIRED.

ImportFromWithMetaData( ) Member Procedure

Format

```
MEMBER PROCEDURE importFromWithMetaData(
    srcType IN VARCHAR2,
    srcLocation IN VARCHAR2,
    srcName IN VARCHAR2,
    metadataSrcType IN VARCHAR2,
    metadataSrcLocation IN VARCHAR2,
    metadataSrcName IN VARCHAR2)
```

Description

This will import the document data from the srcType, srcLocation and srcName field within the source attribute of the document and the metadata from the metadataSrcType, metadataSrcLocation, metadataSrcName, which are specified as parameters. This metadata is in the form of a recognized metadata standard, such as the Dublin Core standard.

Parameters
srcType
This parameter is REQUIRED.
srcLocation
This parameter is REQUIRED.
srcName
This parameter is REQUIRED.
metadataSrcType
This parameter is REQUIRED.
metadataSrcLocation
This parameter is REQUIRED.
metadataSrcName
This parameter is REQUIRED.

Init( ) Member Function

Format

```
MEMER STATIC FUNCTION init ( ) RETURN
    ORD<ObjectType>,
```

Description

This is a constructor-like method for populating a blank interMedia object, in preparation for setting parameters, either through automated or manual means.

Parameters
srcType
This parameter is REQUIRED.
srcLocation
This parameter is REQUIRED.

Init (Overloaded) Member Function

Format

```
MEMBER STATIC FUNCTION init(
    sourceType IN VARCHAR2,
    sourceLocation IN VARCHAR2) RETURN ORD<ObjectType>,
```

Description

This is a constructor-like method for populating a blank interMedia object, in preparation for setting parameters, either through automated or manual means.

Parameters sourceType

This parameter is REQUIRED.

sourceLocation

This parameter is REQUIRED.

InitFromFile( ) Member Function

Format

---

MEMBER STATIC FUNCTION initFromFile(
    sourceLocation IN VARCHAR2,
    sourceName IN VARCHAR2) RETURN ORD<ObjectType>,

---

Description

This is a constructor-like method for populating a blank interMedia object, in preparation for setting parameters, either through automated or manual means.

Parameters sourceLocation

This parameter is REQUIRED.

sourceName

This parameter is REQUIRED.

Process( ) Member Procedure

Format

---

MEMBER PROCEDURE process(
    SELF IN OUT NOCOPY ORD<ObjectType>,,
    command IN      VARCHAR2)

---

Description

The command parameter is a VARCHAR2 field and contain a command which will be interpreted and executed by the appropriate format plug-ins (e.g. the command could be 'fileFormat=real', which means "transform from the existing format to real streaming format").

Parameters command

This will be a parsed string that will only have specific meaning for that given format plug-in. This parameter is REQUIRED.

ProcessCopy( ) Member Procedure

Format

---

MEMBER PROCEDURE processCopy(
    SELF IN OUT NOCOPY ORD<ObjectType>,
    command IN VARCHAR2,
    dest IN OUT NOCOPY ORD<ObjectType>)

---

Description

This works like Process( ) above, except that the command also copies the newly processed media into the destination media object.

Parameters command

This will be a parsed string that will only have specific meaning for that given format plug-in.

dest

The destination to have the ORDSource information copied to.

IdentifyFormat( ) Member Procedure

Format

---

MEMBER PROCEDURE identifyFormat()

---

Description

Return the format of the document by actually looking into the content of the document.

Parameters

None

An Alternative Embodiment

In the preferred embodiment, metadata table 207 is defined as an attribute of an object of the ORDVideo, ORDAudio, ORDImage, or ORDDocument class; in other embodiments, metadata table 207 may be defined as a part of a relational schema. In such an arrangement, rows in metadata table 207 would be related to a particular multimedia item by an identifier for the item. The indices for the field would also be part of the relational schema. The interfaces for such an alternative embodiment would be provided by methods like those used in the present embodiment, and the differences between, the alternative embodiment and the presently-preferred embodiment itself would thus be largely hidden from the user.

Conclusion

The foregoing Detailed Description has disclosed to those skilled in the relevant disciplines how to employ generic representations of metadata in incorporating the metadata associated with an object into a database that includes a representation of the object itself. The Detailed Description has further disclosed the best modes presently known to the inventors of making and using their generic representations of metadata. As is apparent from the different embodiments disclosed in the Detailed Description, there are many ways of implementing the principles of the invention in database systems. While the embodiments disclosed herein are implemented in relational database systems and object-oriented relational database systems and are specifically implemented in a particular object-oriented relational database system, the invention is not limited to these embodiments or to these database systems, or to the particular kinds of multimedia objects and metadata described herein. Rather, its principles may be practiced with any kinds of objects that have metadata, with any kind of metadata, and with any database system that includes representations of objects with metadata.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A generic representation of one or more metadata items relating to an object, the object having an object representation in a database system that is implemented using a processor and data storage accessible thereto, the generic representation being associated with the object representation in the database system, and the generic representation comprising:

a stratum specifier specifying a stratum in the object to which the metadata item applies;

an extent specifier specifying a portion of the stratum to which the metadata item applies; and an item value specifier specifying the metadata item's value.

2. The generic representation set forth in claim 1 wherein:
the stratum specifier, the extent specifier, and the item value specifier are represented using types that are built-in in the database system.

3. The generic representation set forth in claim 1 wherein:
the database system sets the stratum specifier, the extent specifier, and the item value specifier at runtime.

4. The generic representation set forth in claim 1 wherein:
the extent specifier employs a specification of a period of time to specify a segment in the stratum.

5. The generic representation set forth in claim 1 wherein:
the extent specifier employs a specification of a region to specify a segment in the stratum.

6. The generic representation set forth in claim 1 wherein:
the extent specifier employs a specification of a tag to specify a segment in the stratum.

7. The generic representation set forth in claim 6 wherein:
the segment is a document page.

8. The generic representation set forth in claim 1 wherein:
the extent specifier specifies the entire stratum.

9. The generic representation set forth in claim 1 wherein:
there is a plurality of types of extent specifiers.

10. The generic representation set forth in claim 9 wherein the extent specifier comprises:
an extent type specifier and an extent value specifier for the extent type specified by the type specifier.

11. The generic representation set forth in claim 9 wherein:
the plurality of types of extent specifiers includes at least a time extent specifier that employs a specification of a period of time to specify a segment.

12. The generic representation set forth in claim 9 wherein:
the plurality of types of extent specifiers includes at least a space extent specifier that employs a specification of a region to specify a segment.

13. The generic representation set forth in claim 9 wherein:
the plurality of types of extent specifiers includes a tag extent specifier that employs a specification of a tag to specify a segment.

14. The generic representation set forth in claim 9 wherein:
the plurality of types of extent specifiers includes a global extent specifier that specifies the entire stratum.

15. The generic representation set forth in claim 1 wherein:
there is a plurality of types of item value specifiers; and
an item value specifier comprises a value type specifier and a value of the specified type for the item.

16. A database system that is implemented using a processor and data storage accessible thereto and that is of a type in which a field in the database includes a representation of a multimedia object, the database system having the improvement comprising:
a generic representation of one or more metadata items relating to the multimedia object, the generic representation including
a stratum specifier specifying a stratum in the object to which the metadata item applies;
an extent specifier specifying a portion of the stratum to which the metadata item applies; and
an item value specifier specifying the metadata item's value and the generic representation being usable by the database system in queries concerning the object.

17. The improved database system set forth in claim 16 wherein:
the database system is an object relational database system;
the representation of the multimedia object is a first object having a multimedia object class in a field of a relational table of the object relational database system; and
the generic representation is a second object that has a generic representation class and that is contained in the first object.

18. The improved database system set forth in claim 17 wherein:
methods executed by the database system for the generic representation class include
a method that manipulates a value of the generic representation; and
a method that given specifiers from the generic representation returns a segment of the multimedia object that is specified by the specifiers.

19. The improved database system set forth in claim 18 wherein:
there is a plurality of methods that manipulate a value of the generic representation, the plurality including a method that loads information for the generic representations for a given stratum in bulk.

20. The improved database system set forth in claim 18 wherein:
a parameter used with methods that manipulate an item value specifies in the alternative whether the item value to be manipulated applies to the entire stratum or whether the item value to be manipulated applies to a segment of the stratum.

21. A data storage device, characterized in that:
the data storage device contains code which when executed by a processor implements a database system that is capable of including of type which includes a generic representation of one or more metadata items relating to an object, the object having an object representation in the database system, the generic representation being associated with the object representation in the database system, and the generic representation comprising:
a stratum specifier specifying a stratum in the object to which the metadata item applies;
an extent specifier specifying a portion of the stratum to which the metadata item applies; and
an item value specifier specifying the metadata item's value.

22. The data storage device set forth in claim 21 further characterized in that:
the generic representation's stratum specifier, extent specifier, and item value specifier are represented using types that are built-in in the database system.

23. The data storage device set forth in claim 21 further characterized in that:
the database system sets the stratum specifier, the extent specifier, and the item value specifier at runtime.

24. The data storage device set forth in claim 21 further characterized in that:
the generic representation's extent specifier employs a specification of a period of time to specify a segment in the stratum.

25. The data storage device set forth in claim 21 further characterized in that:

the generic representation's extent specifier employs a specification of a region to specify a segment in the stratum.

26. The data storage device set forth in claim 21 further characterized in that:

the generic representation's extent specifier employs a specification of a tag to specify a segment in the stratum.

27. The data storage device set forth in claim 26 further characterized in that the segment is a document page.

28. The data storage device set forth in claim 21 further characterized in that:

the generic representation's extent specifier specifies the entire stratum.

29. The data storage device set forth in claim 21 further characterized in that:

there is a plurality of types of extent specifiers.

30. The data storage device set forth in claim 29 further characterized in that:

the generic representation's extent specifier comprises an extent type specifier and an extent value specifier for the extent type specified by the type specifier.

31. The data storage device set forth in claim 29 further characterized in that:

the plurality of types of extent specifiers includes at least a time extent specifier that employs a specification of a period of time to specify a segment.

32. The data storage device set forth in claim 29 further characterized in that:

the plurality of types of extent specifiers includes at least a space extent specifier that employs a specification of a region to specify a segment.

33. The data storage device set forth in claim 29 further characterized in that:

the plurality of types of extent specifiers includes a tag extent specifier that employs a specification of a tag to specify a segment.

34. The data storage device set forth in claim 29 further characterized in that:

the plurality of types of extent specifiers includes a global extent specifier that specifies the entire stratum.

35. The data storage device set forth in claim 21 further characterized in that:

there is a plurality of types of item value specifiers; and an item value specifier comprises a value type specifier and a value of the specified type for the item.

36. A data storage device, characterized in that:

the data storage device contains code which when executed by a processor implements a database system of a type in which a field in the database includes a representation of a multimedia object, the database system having the improvement comprising a generic representation of one or more metadata items relating to the multimedia object, the generic representation including a stratum specifier specifying a stratum in the object to which the metadata item applies;

an extent specifier specifying a portion of the stratum to which the metadata item applies; and an item value specifier specifying the metadata item's value and the generic representation being usable by the database system in queries concerning the object.

37. The data storage device set forth in claim 36 characterized in that:

the database system is an object relational database system;

the representation of the multimedia object is a first object having a multimedia object class in a field of a relational table of the object relational database system; and the generic representation is a second object that has a generic representation class and that is contained in the first object.

38. The data storage device set forth in claim 37 characterized in that:

methods executed by the database system for the generic representation class include a method that manipulates a value of the generic representation; and a method that given specifiers from the generic representation returns a segment of the multimedia object that is specified by the specifiers.

39. The data storage device set forth in claim 38 characterized in that:

there is a plurality of methods that manipulate a value of the generic representation, the plurality including a method that loads information for the generic representation for a given stratum in bulk.

40. The data storage device set forth in claim 38 characterized in that:

a parameter used with methods that manipulate an item value specifies in the alternative whether the item value to be manipulated applies to the entire stratum or whether the item value to be manipulated applies to a segment of the stratum.

* * * * *